United States Patent [19]

Sato

[11] Patent Number: 4,685,941
[45] Date of Patent: Aug. 11, 1987

[54] COMPRESSED AIR SUPPLYING DEVICE
[75] Inventor: Kazuo Sato, Kanagawa, Japan
[73] Assignee: Tokico Ltd., Kawasaki, Japan
[21] Appl. No.: 799,738
[22] Filed: Nov. 19, 1985
[30] Foreign Application Priority Data Nov. 20, 1984 [JP] Japan .......................... 59-176043[U]

[51] Int. Cl.[4] ............................................. B01D 53/26
[52] U.S. Cl. ............................................ 55/163; 55/21
[58] Field of Search ................................. 55/21, 163

[56] References Cited
U.S. PATENT DOCUMENTS 3,080,693  3/1963  Glass et al. ........................... 55/163
3,937,622  2/1976  Hewitt et al. ......................... 55/163
4,549,888  10/1985  Fannin ................................... 55/163

Primary Examiner—Larry I. Schwartz
Attorney, Agent, or Firm—Wenderoth, Lind & Ponack

[57] ABSTRACT

A compressed air supplying device has an air compressor, a dryer connected to an outlet of the air compressor, an air reservoir connected to an outlet of the dryer and connectable to pneumatic equipment, a valve for selectively placing piping between the air compressor and the dryer in communication with the atmosphere, and a control device for controlling the operation of the air compressor and the valve and for detecting the pressure in the air reservoir and detecting the accumulated operational time and/or the number of operations of the air compressor such that when the accumulated operated time and/or the number of operations of the air compressor exceeds a predetermined amount the valve is opened in order to regenerate by causing the compressed air in the reservoir to flow toward the atmosphere through the dryer.

1 Claim, 1 Drawing Figure

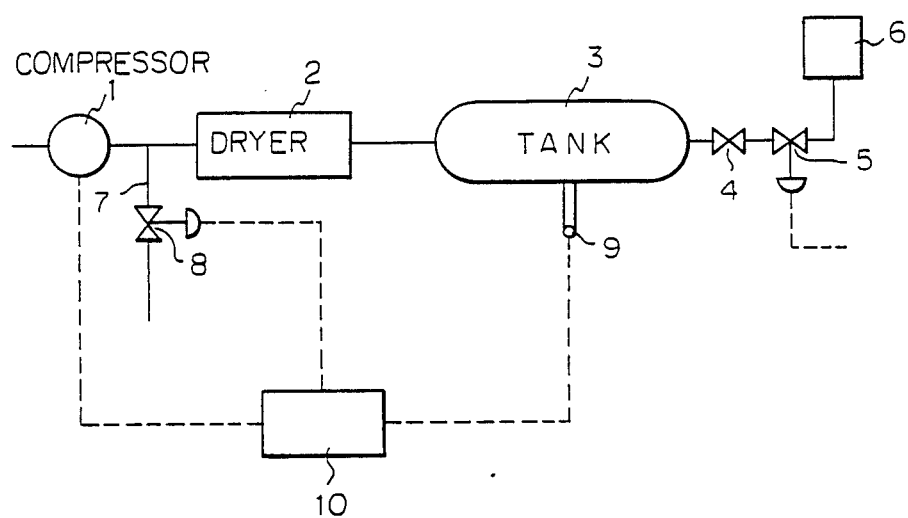

COMPRESSED AIR SUPPLYING DEVICE

BACKGROUND OF THE INVENTION

1. Field of the Invention

This invention relates to a compressed air supplying device for supplying compressed air to various types of pneumatic equipment.

2. Description of the Prior Art

In supplying compressed air to pneumatic equipment such as an air cylinder, it is usually required to remove water from the compressed air so as to prevent the various obstructions which are caused by water in compressed air. Accordingly, an air dryer is usually interposed between an air compressor and the pneumatic equipment to remove water from the compressed air. Typically, the air dryer comprises a drying agent such as silica gel. However, the water absorbing function of the drying agent gradually deteriorates in response to an increase in the amount of absorbed water, and it is thus necessary to replace or regenerate the drying agent occasionally.

Japanese Utility Model Laid Open Publication No. 59-27171 shows one example of a compressed air supplying device having a regenerating device for a drying agent, wherein an air reservoir for storing regenerated compressed air is provided on the outlet side of a dryer, and dry air of a predetermined pressure is stored therein during the operation of the air compressor while when the operation of the air compressor is stopped, the dry air in the regenerating air reservoir is supplied through a pressure reducing valve to the dryer whereby the drying agent in the dryer is regenerated. However, there are shortcomings in the prior art device since the air reservoir which exclusively stores regenerating compressed air is disadvantageous in view of the cost involved and the space required for its installation.

SUMMARY OF THE INVENTION

An object of the invention is to provide a compressed air supplying device which enables a drying agent to be efficiently regenerated and dry air to be supplied to pneumatic equipment which is simple in construciton, compact in size and low in cost.

The compressed air supplying device according to the invention comprises an air compressor, a dryer connected to an outlet of the air compressor, an air reservoir connected to the an outlet of the dryer and connectable to pneumatic equipment, a valve for selectively placing piping between the air compressor and the dryer in communication with the atmosphere, and a control device for controlling the operation of the air compressor and the valve and for detecting the pressure in the air reservoir and for detecting the accumulated operational time and/or the number of operations of the air compressor such that when the accumulated operational time and/or the number of operations of the air compressor exceeds a predetermined amount said control device causes said valve to open whereby the dryer is regenerated by causing the compressed air in the reservoir flowing toward the atmosphere through the dryer.

BRIEF DESCRIPTION OF THE DRAWING

Further objects and advantages of the invention will become apparent from the following detailed description and accompanying drawing which exemplifies a preferred embodiment of the invention, in which:

The single FIGURE shows a schematic drawing of an embodiment of the present invention.

DETAILED DESCRIPTION OF THE PREFERRED EMBODIMENT

Shown at numeral 1 in the drawing is an air compressor of any desired type. A dryer 2 contained therein drying agent such as silica gel is connected to the outlet side of the air compressor 1, and an air reservoir 3 storing pressurized dry air is connected to the outlet side of the dryer 2. Pneumatic equipment 6 is connected to the air reservoir 3 through a pressure reducing valve 4 and a shut-off valve 5. The pneumatic equipment 6 may be of any desired type such as an air spring unit of a vehicle suspension system and the like which utilizes pressurized air. A branched pipeline 7 is provided on a piping between the air compressor 1 and the dryer 2, and a shut-off valve 8 is provided in the pipeline 7 to selectively place the pipeline 7 in communication with the atmosphere.

A pressure sensor 9 is mounted on the air reservoir 3 to detect the pressure in the air reservoir 3. A control device 10 receives the signal from the pressure sensor 9, and is provided therein with a counter (not shown) for counting the number of operations of the air compressor 1 and/or the accumulated operational time of the air compressor 1. Further, the control device 10 is connected to the air compressor 1 and to the shut-off valve 8 for controlling the operation thereof.

In operation, the water in the pressurized air from the air compressor 1 is removed in the dryer 2, and the dry compressed air is stored in the air reservoir 3. Upon the demand of the pneumatic component 6, the valve 5 opens and the air in the air reservoir 3 is supplied to the pneumatic component 6 through the pressure reducing valve 4. When the pressure in the air reservoir 3 decreases below a first predetermined pressure $P_1$, the pressure sensor 9 detects the pressure and control device 10 supplies a signal to the air compressor 1 to actuate the air compressor. When the pressure in the air reservoir 3 elevates to a second predetermined pressure $P_2$ which is higher than the first predetermined pressure $P_1$, the operation of the air compressor 1 is stopped.

Similar operation is repeated, and the control device 10 counts the integrated number of operations of the air compressor 1 and/or the accumulated operational time of operation of the air compressor 1, thereby detecting or predicting at a relevant point that a considerable amount of water has been absorbed in the drying agent in the dryer 2.

The control device 10 actuates the air compressor 1 until the pressure in the air reservoir 3 elevates to the second predetermined pressure $P_2$ and, thereafter, opens the shut-off valve 8. The dry compressed air in the air reservoir 3 flows through the dryer 2 to the atmosphere. A pressure reducing valve mechanism (not shown) is provided on the outlet side of the dryer 2. Thus, the dry air in the air reservoir 3 flows backward through the dryer 2 at a reduced pressure thereby removing water in the drying agent in the dryer 2. After a predetermined time interval or when the pressure in the air reservoir 3 decreases to the first predetermined pressure $P_1$, the control device 10 closes the shut-off valve 8. The drying agent in the dryer 2 is regenerated when the dry air in the air reservoir 3 is caused to flow toward the atmosphere through the dryer 2.

According to the invention the drying agent in the dryer is automatically regenerated by utilizing dry compressed air stored in the air reservoir after a suitable time interval. Thus, it is possible to supply dry compressed air to the pneumatic component and, it is not necessary to exclusively provide an air reservoir for regenerating compressed air. Accordingly, it is simple in construction, compact in size and low in cost.

What is claimed is:

1. A compressed air device for supplying compressed air to pneumatic equipment, said compressed air device comprising:

an air compressor for compressing air, said air compressor having an outlet through which the compressed air is fed;

a dryer connected to said outlet of said air compressor, said dryer having a drying agent for removing moisture from the compressed air fed through said outlet of said air compressor, said dryer having an outlet through which the dried compressed air is fed;

an air reservoir directly connected to said outlet of said dryer for storing the dried compressed air fed through said outlet of said dryer, said air reservoir having an outlet connected to the pneumatic equipment through which the dried compressed air stored in said air reservoir is fed;

a valve connect to said outlet of said air compressor between said air compressor and said dryer, said valve movable between a closed position in which said outlet of said air compressor is open to said dryer and an open position in which said outlet of said air compressor is open to said dryer and the atmosphere;

a pressure sensor connected to said air reservoir for detecting the pressure of the dried compressed air stored in said air reservoir; and a control device connected with said pressure sensor, said valve and said air compressor, said control device detecting at least one of the accumulated operational time of said air compressor and the number of times said air compressor is operated, said control device moving said valve to said open position when said at least one of the accumulated operational time of said air compressor and the number of times said air compressor is operated exceeds a predetermined amount thereby causing compressed dried air stored in said air reservoir to be fed back through said dryer to remove moisture from said drying agent and then through said valve to the atmosphere, said control device moving said valve to said closed position when the pressure of the dried compressed air stored in said air reservoir as sensed by said pressure sensor is reduced to a first pressure that is greater than atmospheric pressure when the compressed dried air is fed back through said dryer.

* * * * *